US008762204B2

(12) United States Patent
Desikan et al.

(10) Patent No.: US 8,762,204 B2
(45) Date of Patent: Jun. 24, 2014

(54) REVIEWING THE SUITABILITY OF WEBSITES FOR PARTICIPATION IN AN ADVERTISING NETWORK

(75) Inventors: Pavan Kumar Desikan, San Jose, CA (US); Lawrence Ip, Mountain View, CA (US); Timothy James, Palo Alto, CA (US); Sanjeev Kulkarni, San Jose, CA (US); Prasenjit Phukan, San Francisco, CA (US); Dmitriy Portnov, San Jose, CA (US); Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 12/839,262

(22) Filed: Jul. 19, 2010

(65) Prior Publication Data
US 2010/0287041 A1 Nov. 11, 2010

Related U.S. Application Data

(63) Continuation of application No. 11/170,725, filed on Jun. 29, 2005, now Pat. No. 7,788,132.

(51) Int. Cl.
*G06Q 30/00* (2012.01)
*G06Q 30/02* (2012.01)

(52) U.S. Cl.
CPC .................................. *G06Q 30/0265* (2013.01)
USPC ....................................................... 705/14.6

(58) Field of Classification Search
CPC ............................................... G06Q 30/0263
USPC ....................................................... 705/14.6
See application file for complete search history.

(56) References Cited

U.S. PATENT DOCUMENTS

| 6,029,141 | A | 2/2000 | Bezos et al. |
| 2003/0046149 | A1* | 3/2003 | Wong .............................. 705/14 |
| 2003/0046161 | A1* | 3/2003 | Kamangar et al. .............. 705/14 |
| 2004/0059708 | A1 | 3/2004 | Dean et al. |
| 2004/0093327 | A1 | 5/2004 | Anderson et al. |
| 2004/0138946 | A1* | 7/2004 | Stolze ............................. 705/14 |

(Continued)

FOREIGN PATENT DOCUMENTS

| JP | 2001-022840 | 1/2001 |
| JP | 2001-22840 | 1/2001 |
| JP | 2002-063403 | 2/2002 |
| JP | 2002-189925 | 7/2002 |

(Continued)

OTHER PUBLICATIONS

Notice of Reasons for Rejection for Japanese Patent Application No. 2008-519535, mailed Jul. 20, 2010 (4 pgs.) with translation (5 pgs.).

(Continued)

*Primary Examiner* — James W Myhre
(74) *Attorney, Agent, or Firm* — Foley and Lardner LLP; John D. Lanza

(57) ABSTRACT

The way in which Websites are reviewed for use in an advertising network may be improved by (a) accepting a collection including one or more documents, (b) determining whether or not the collection complies with policies of an advertising network, and (c) approving the collection if it was determined that the collection complies with the policies. The collection may be added to the advertising network if the collection is approved such that (e.g., content-targeted) advertisements may be served in association with renderings of documents included in the collection. The collection may be a Website including one or more Webpages. The policy may concern (A) content of the one or more documents of the collection, (B) usability of a Website wherein the collection of one or more documents is a Website including one or more Webpages, and/or (C) a possible fraud or deception on the advertising network or participants of the advertising network by the collection.

20 Claims, 7 Drawing Sheets

(56) References Cited

U.S. PATENT DOCUMENTS

| | | | |
|---|---|---|---|
| 2004/0186776 A1* | 9/2004 | Llach | 705/14 |
| 2004/0254813 A1 | 12/2004 | Messer | |
| 2005/0021649 A1 | 1/2005 | Goodman et al. | |
| 2005/0050027 A1 | 3/2005 | Yeh et al. | |
| 2005/0071741 A1 | 3/2005 | Acharya et al. | |
| 2005/0222902 A1* | 10/2005 | Coit et al. | 705/14 |
| 2006/0095322 A1 | 5/2006 | Dierks | |
| 2009/0240589 A1* | 9/2009 | Vora et al. | 705/14.6 |
| 2011/0208579 A1* | 8/2011 | Krishnamoorthy | 705/14.45 |

FOREIGN PATENT DOCUMENTS

| | | |
|---|---|---|
| JP | 2002-288076 | 10/2002 |
| JP | 2003-076875 | 3/2003 |
| JP | 2005-128478 | 5/2005 |
| KR | 2002-0084373 | 11/2002 |
| WO | WO 00/79448 | 12/2000 |
| WO | WO 03/014975 | 2/2003 |
| WO | WO 2004/029758 | 4/2004 |
| WO | WO 2005/006283 | 1/2005 |

OTHER PUBLICATIONS

Final Notice of Preliminary Rejection for Korean Patent Application No. 10-2008-7002434, mailed Nov. 29, 2010 (6 pgs.) with translation (7 pgs.).

Supplementary European Search Report for European Patent Application No. 06785775.5, mailed Oct. 6, 2010 (8 pgs.).

Translation of a Final Notice of Rejection for Japanese Patent Application No. 2008-519535, mailed Apr. 5, 2011 (4 pgs.).

Notice of Final Rejection for Korean Patent Application No. 10-2011-7007466, mailed Aug. 27, 2012 (4 pgs.) with translation (3 pgs.).

First Examination Report for Indian Patent Application No. 179/MUMNP/2008, mailed Jun. 30, 2011 (2 pgs.).

Notice of Final Rejection for Korean Patent Application No. 10-2008-7002434, mailed Oct. 31, 2011 (5 pgs.) with translation (4 pgs.).

Decision of Rejection for Japanese Patent Application No. 2008-519535, mailed Nov. 29, 2011 (2 pgs.) with translation (3 pgs.).

Office Action for Canadian Patent Application No. 2,613,543, mailed Dec. 8, 2011 (3 pgs.).

Notification of the Second Office Action for Chinese Patent Application No. 200680031469.5, mailed Dec. 28, 2011 (5 pgs.) with translation (8 pgs.).

Updated Issues on Search Engines, Part 3, Monthly Net Hanba, Kobunsha Publishing Co., Ltd., vol. 5, No. 9 (Dec. 1, 2004) (11 pgs.) with partial translation (1 pg.).

Canadian Office Action on 2,613,543 dated Jul. 30, 2013.

\* cited by examiner

REVIEWING THE SUITABILITY OF WEBSITES FOR PARTICIPATION IN AN ADVERTISING NETWORK

§0. RELATED APPLICATIONS

The present application is a continuation of U.S. patent application Ser. No. 11/170,725 (referred to as "the '725 application" and incorporated herein by reference), filed on Jun. 29, 2005 now U.S. Pat. No. 7,788,132, titled "REVIEWING THE SUITABILITY OF WEBSITES FOR PARTICIPATION IN AN ADVERTISING NETWORK," and listing Pavan Kumar Desikan, Lawrence Ip, Timothy James, Sanjeev Kulkarni, Prasenjit Phukan, Dmitriy Portnoy and Gokul Rajaramas the inventors.

§1. BACKGROUND OF THE INVENTION

§1.1 Field of the Invention

The present invention concerns helping to ensure a quality experience in an advertising network. In particular, the present invention concerns determining whether or not a Website complies with policies, and/or meets certain quality standards of an advertising network.

§1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords advertising system by Google of Mountain View, Calif., delivers ads targeted to keywords from search queries. Similarly, content targeted ad delivery systems have been proposed. For example, U.S. patent application Ser. Nos. 10/314,427 (incorporated herein by reference and referred to as "the '427 application") titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and 10/375,900 (incorporated by reference and referred to as "the '900 application") titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Hank, Deepak Jindal and Narayanan Shivakumar as inventors, describe methods and apparatus for serving ads relevant to the content of a document, such as a Web page for example. Content targeted ad delivery systems, such as the AdSense advertising system by Google for example, have been used to serve ads on Web pages.

As can be appreciated from the foregoing, serving ads relevant to concepts of text in a text is useful because such ads presumably concern a current user interest. Consequently, such content-targeted advertising has become increasingly popular. However, such advertising systems still have room for improvement.

The success of the content-targeted advertising networks, such as Google AdSense program for example, relies on three (3) important constituents—advertisers, Website publishers (referred to below as "Web publishers"), and end users. Many advertisers want be assured that the Websites where their ads are displayed are of a high quality, will generate a positive return on investment (ROI), and will not cause any controversy for them Web publishers need to continue to attract end users through relevant and high quality content. Last, but not least, end users generally want to visit only those Websites that provide a good experience. Further, end users generally select only those ads that are relevant to the context of the Webpage and that help them find a product or service that meets their needs. A high-quality network is thus critical to ensure that a virtuous cycle is created that helps expands the advertising network by attracting new publishers, advertisers and end users.

Current ways to ensure the quality of Website participating in an advertising network include, for example, reviewing Websites manually (e.g., to ensure that they comply with policy guidelines, that they do not create a poor end-user experience, and that the content allows relevant ads to be targeted). Unfortunately, manual review of Websites is ill-equipped to handle the explosive growth experienced by online advertising networks.

In view of the difficulties in manually reviewing many new Websites in a time and cost effective manner, some advertising networks have limited such manual review to only those Websites that advertisers and/or end users have complained about. Unfortunately, end users and/or advertisers may demand a more proactive approach. Therefore, having a more proactive ad Website approval process would be useful.

§2. SUMMARY OF THE INVENTION

Embodiments consistent with the present invention improve the way in which Websites are reviewed for use in an advertising network. At least some embodiments consistent with the present invention may (a) accept a collection including one or more documents, (b) determine whether or not the collection complies with policies of an advertising network, and (c) approve the collection if it was determined that the collection complies with the policies.

In at least some embodiments consistent with the present invention, the collection is added to the advertising network if the collection is approved such that (e.g., content-targeted) advertisements may be served in association with renderings of documents included in the collection.

In at least some embodiments consistent with the present invention, the collection including one or more documents is a Website including one or more Webpages.

In at least some embodiments consistent with the present invention, the policy concerns (A) content of the one or more documents of the collection, (B) usability of a Website wherein the collection of one or more documents is a Website including one or more Webpages, and/or (C) a possible fraud or deception on the advertising network or participants of the advertising network by the collection.

§3. BRIEF DESCRIPTION OF THE DRAWINGS

§4. DETAILED DESCRIPTION

Figure 1:
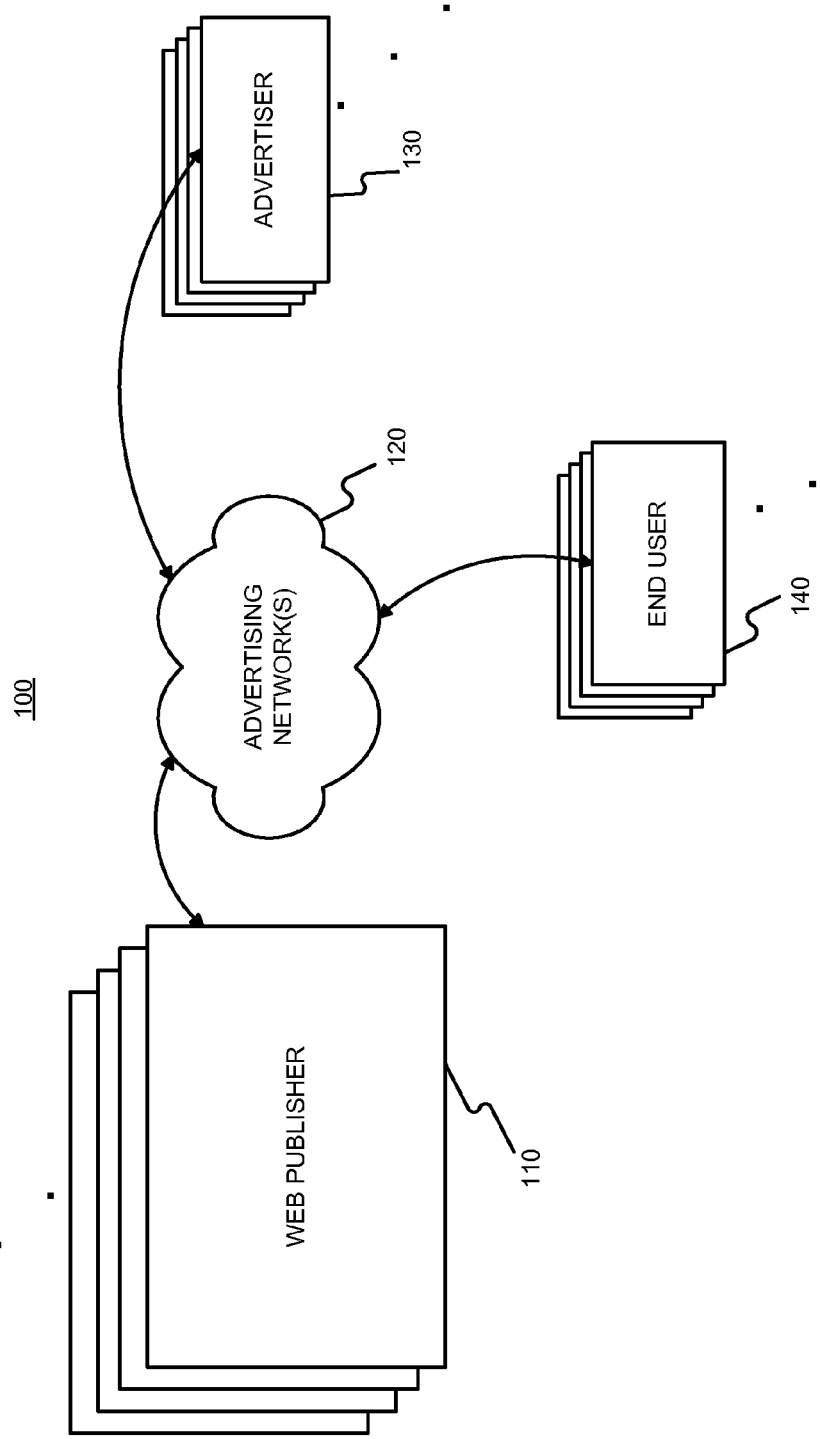
FIG. 1 is a diagram showing parties or entities that can interact with an advertising network, such as a content-targeting advertising network for example.

The present invention may involve novel methods, apparatus, message formats, and/or data structures for checking Websites for policy violations, and/or determining quality scores for Websites, which may be used to help an advertising network to ensure that it contains only high quality Websites. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Finally, some conclusions regarding the present invention are set forth in §4.4.

§4.1 Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

A "policy" of an advertising network is a rule that is determinative of whether a Webpage or Website (or some other document or collection of documents) may participate in the advertising network. That is, if a Webpage or Website violates a policy, the advertising network will prohibit it from participating in the advertising network (although a Website may attempt to participate in an advertising network using fraudulent or illegitimate means). Since policies may be defined by the advertising network, different advertising networks may have different policies such that a Website that violates a policy in one advertising network might not violate any policies in another advertising network.

A "quality score" is typically a quantitative indicator of the value or relative value of the participation of a Website or Webpage (or some other document or collection of documents) in an advertising network. A quality score may be applied to a threshold to determine a qualitative indicator.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information"

§4.2 Exemplary Environments in Which, or With Which, the PRESENT INVENTION MAY OPERATE FIG. 1 is a diagram showing parties or entities that can interact with an advertising network 120 in an exemplary environment 100. The environment 100 may include an advertising network 120 which serves ads on, or otherwise in association with, a number of Websites from Web publishers 110 and viewed by end users 140. Web publishers 110 may request to participate in the advertising network 120 in order to get revenue by having advertisements rendered on their Websites. Advertisers 130 may enter, track and maintain their advertisements on the advertisement network 120. The ads may be in the form of graphical ads such as so-called banner ads, text only ads, image ads, audio ads, video ads, ads combining one of more of any of such components, etc. The ads may also include embedded information, such as a link, and/or machine executable instructions. These ads may be rendered on, or otherwise in association with, Websites of Web publishers 110 when end users 140 access these Websites.

As a result, it can be understood that the quality of Websites participating in an advertising network 120 is important to the satisfaction of advertisers 130 and end users 140. To reiterate, advertisers 130 often want to be assured that the Websites that their ads are displayed on or with are of high quality, will generate a positive return on investment, and will not be the source of controversy for the advertiser. Web publishers 110 want to continue to attract end-users 140 through relevant and high quality content. This is because end users 140 are more likely to want to visit Websites that provide a good experience, and are more likely to select ads that are relevant to the context of the Webpage and help them find a product or service that meets their needs.

From the aforementioned, it is apparent that a system able to automatically assess policy compliance, and/or the quality of Websites would be useful. At least some embodiments consistent with the present invention may automatically assess Websites for compliance with policies of an advertising network 120. Such an assessment may be done before the Website can participate in the advertising network. Such an assessment may be repeated periodically. Such periodic reassessments may be very useful for advertising system where the content of an approved Website may be changed by the Web publisher. Such policy compliance assessments may be useful to help find Websites that were able to participate in the advertising network using unauthorized means. Upon assessing the Website, such embodiments may automatically approve or disapprove the Website, or may seek assistance through manual review.

At least some embodiments consistent with the present invention may automatically analyze Websites to determine one or more quality metrics (scores). Such quality score(s) may be used to determine incentives or disincentives for (or event to remove) Websites participating in the advertising network. Alternatively, or in addition, such quality score(s) may be used to prospect for high quality Websites not participating in the advertising network.

Various exemplary embodiments of the present invention are now described in §4.3.

§4.3 Exemplary Embodiments

Figure 2:
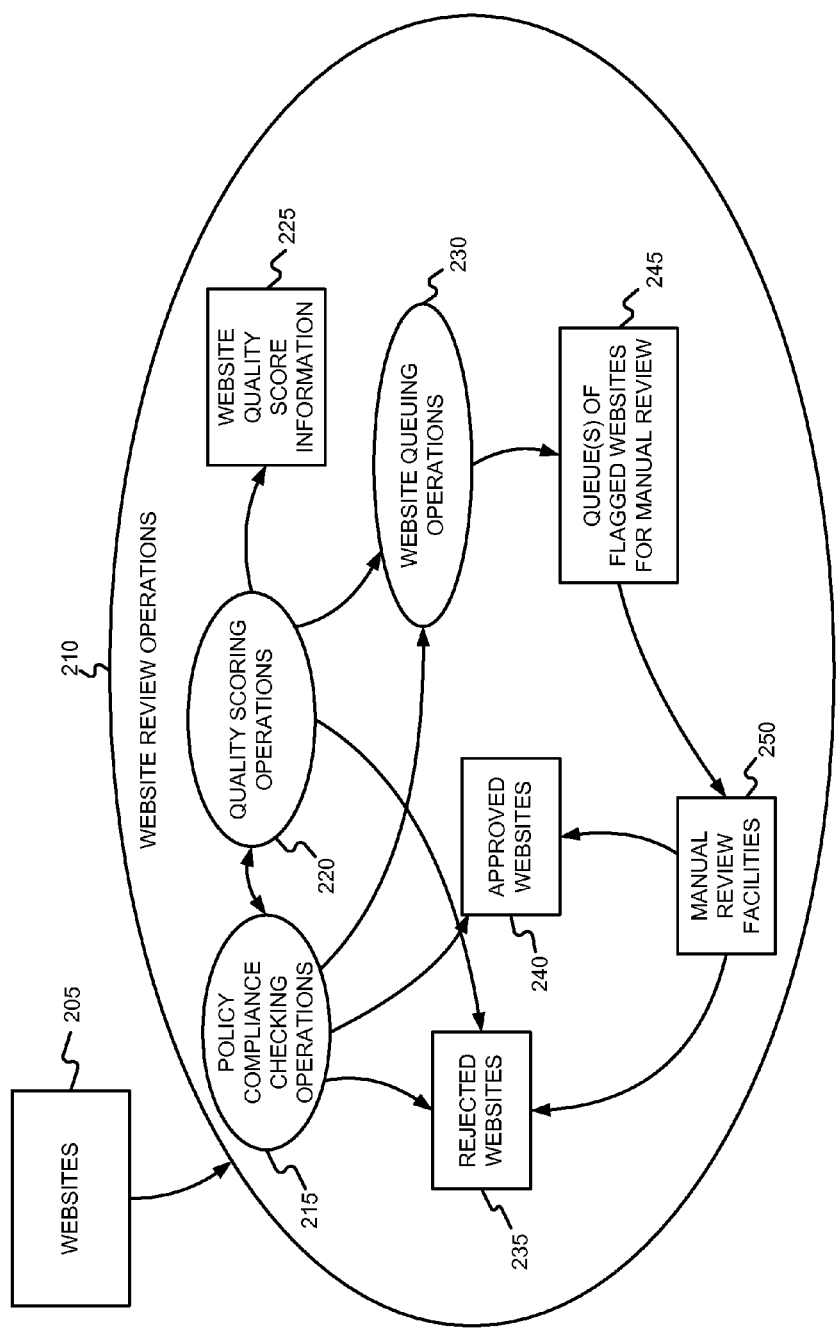
FIG. 2 is a bubble diagram of exemplary operations for automatically checking Websites for compliance with policies and/or scoring Websites, which may be performed in a manner consistent with the present invention, as well as information that may be used and/or generated by such operations.

FIG. 2 is a bubble diagram of exemplary operations for reviewing Websites in a manner consistent with the present invention, as well as information that may be used and/or generated by such operations. Website review operations 210 may accept Websites 205 (such as from Web publishers seeking to join the advertising network for example). Such operations 210 may assess whether such Websites 205 comply with policies and/or determine one or more quality scores for the Websites.

Websites that are of high quality and that comply with policies of the advertising network may be served and promoted, while Websites that violate ad network policies may be excluded from the advertising network and Websites that are of low quality may be penalized (which may include being excluded from the advertising network). The Website review operations 210 can review Websites that may be participating in the advertising network, or Websites outside of the advertising network. The Websites reviewed by the Website review operations 210 that are in the advertising network may have been previously examined and approved. Thus, the Website review operations 210 can be used to reassess such Websites as part of a follow-up routine. This is useful in cases where Web publishers change their Websites in ways that might cause the Website to violate policies and/or degrade their quality. This is also useful to reassess Websites in view of new policies. Furthermore, some Websites that are in the advertising network may be unauthorized. An authorized Website is a Website that has gone through the appropriate procedures to join the advertising network (e.g., formally requested to participate in the advertising network) and that had been approved by the advertising network. Conversely, an unauthorized Website is a Website that improperly participates in the advertising network. Such Websites might not have requested to join the advertising network, or may have requested to join the advertising network but not approved. Thus, one use of the Website review operations 210 may be to examine unauthorized Websites in the advertising network to determine whether they should continue to be served (e.g., ratified as a legitimate participant in the advertising network), or excluded from the advertising network.

Nonetheless, it is expected that the Website review operations 210 will be reviewing several Websites 205 that do not participate in the advertising network, but are seeking to join the advertising network. In at least some embodiments consistent with the present invention, every Website 205 requesting to join the advertising network will go through the Website review operations 210 to be checked for policy compliance. Once the Website review operations 210 approve a Website, the Website may be admitted in the advertising network as a legitimate participant. Periodic follow-up checks can be conducted to help ensure that the advertising network contains high quality Websites.

In addition, other Websites not participating in the advertising network and not requesting to join the advertising network may still be reviewed by operations 210 to help find high-quality Websites as prospects to solicit to join the advertising network and to help maintain or raise its quality.

The Website review operations 210 may include a number of operations performing various tasks to asses a Website 205. Specifically, the Website review operations 210 may include policy compliance checking operations 215, quality scoring operations 220, queuing operations 230, and manual review facilities 250. The policy compliance checking operations 215 may perform initial and follow-up checks to determine if the Websites 205 have any policy violations. The Websites approved by policy compliance checking operations 215 may be stored as approved Websites 240, whereas disapproved Websites may be stored as rejected Websites 235. Websites that have not been approved, but that cannot be disapproved with uncertainty may be flagged and sent to an appropriate manual review queue 245 by the queuing operations 230. Further, the policy compliance checking operations 215 may forward Websites to the quality scoring operations 220.

The quality scoring operations 220 are may be used to determine quality scores 225 for the Websites. In sever cases, quality scoring operations 220 may remove a Website from the advertising network. In other cases, quality scoring operations 220 may flag low quality Websites and send them to queuing operations 230 where they may be queued for manual review. The Website quality score information 225 may be used by humans and/or other automated operations (not shown) for further analysis or for other uses.

Website queuing operations 230 may queue Websites based on the type and/or severity of policy violations as determined by the policy compliance checking operations 215, and/or based on low quality scores as determined by the quality scoring operations 220. Accordingly, flagged Websites may be placed in one or more queues 245 for manual review. At the manual review facilities 250, humans may obtain the queued flagged Websites and decide to either accept or reject the Website. The Website may be subsequently processed accordingly.

The policies to be checked by the policy compliance checking operations 215 may be defined by the particular advertising network. In the context of the present invention, policies are defined such that, if a Websites violates any policy, it may not participate (legitimately) in the advertising network. Thus, policies are those rules whose violation is not tolerated. Therefore, the policy compliance checking operations 215 may either approve or disapprove the Websites 205. Policy violations may be generally classified as (a) violations related to the content of the Website (e.g., content too general to provide specific targeting, not enough content, bad or controversial content, etc.), (b) violations related to the publisher or source of the Website, (c) violations related to usability of the Website (e.g., under construction, broken links, slow page loads, improper use of frames, etc.) and (d) violations related to fraud (e.g., attempting to defraud advertisers and/or the ad network).

Some examples of possible Website content policy violations include hate-centric Websites (e.g., racist, anti-Semitic, anti-gay, anti-immigrant, etc.), Websites mainly concerning individual hate campaigns (e.g., Hate Bush, Microsoftsucks.com, etc), Websites advocating or facilitating violence or terror (e.g., Al Qaeda, etc.), Websites offering malicious advice or advocating or facilitating malicious activities (e.g., homemade bombs, dangerous practical jokes, etc.), Websites offering or facilitating sales of illegal drugs or drug paraphernalia, Websites offering or facilitating illegal sales of pharmaceuticals (an exception may be made for over-the-counter and herbal drugs if they do not pass themselves off as prescription), Websites facilitating or advocating software or network hacking, (e.g., Websites relating to or giving tips on how to hack IT infrastructure), Websites facilitating or advocating software or network cracking (e.g., Websites relating to or giving tips on how to crack software applications), Websites offering or facilitating sales of firearms (or other weapons) or illegal sales of firearms (or other weapons), Websites including pornography, hard-core pornography and/or adult-oriented content (e.g., Websites containing adult-oriented pictures, text, dating services, erotic stories, or links), Websites with profanity or excessive profanity, Websites offering or facilitating or promoting the sale of product knock-offs or counterfeit goods, Websites promoting or facilitating the perpetration of hoaxes or scams (e.g., pyramid schemes), Websites relying on typographical errors of trademarks (e.g., typo-cyber squatting Websites), Websites offering or facilitating the sale of counterfeit documents (e.g., fake passports, fake driver licenses, fake birth certificates, etc.), Websites offering or facilitating the sale of term papers (e.g., "paper mills"), Websites offering or facilitating unauthorized downloading or rendering of copyrighted content, Websites offering sales of alcohol, Websites offering sales of alcohol other than wine, Websites offering sales of alcohol to minors, Websites offering or facilitating sales of tobacco, Websites offering or facilitating sales of tobacco to minors, Websites facilitating online gambling, Websites facilitating online gambling for minors, etc.

At least some of the foregoing content policy violations can be discovered, for example, by determining whether the Website includes certain words, phrases, or collections of words and/or phrases, whether the Website includes greater than a predetermined percentage and/or count of certain words and/or phrases, whether the Website has certain images (e.g., Swastikas, betting boards, nudes, guns, cigarette brands, hard alcohol brands, etc.), etc. Further a manual list of Websites with a given type or class of policy violation may be used to train an expert system (e.g., neural networks, Bayesian networks, support vector machines, etc.) to classify other Websites as having the policy violation or not.

Some examples of policy violations related to the publisher or source of the Website include Websites supported by blacklisted countries (e.g., Cuba), Web publishers having a history of fraud, Web publishers previously kicked off of the advertising network, etc. At least some of these policy violations can be determined using a location of the Web server. Other information available for aiding in the determination of violations related to the publisher may include address, social security number, email, IP address of the Webserver, Website name, etc.

Some examples of Website usability policy violations include Websites with domain name server (DNS) errors (such as, for example, URL does not exist, URL down, etc.) Websites with broken links, "offline" Websites, "under construction" Websites, Websites with excessive pop-ups/pop-unders (e.g., more than N (e.g., one) pop-up or pop-under ad on any given webpage load), chat Websites, non-HTML Websites (e.g., directory indexes, flash, WAP), spy ware Websites, homepage takeover Websites, etc. Other examples could include Websites that try to install malicious software on the user's computer, or Websites that affect usability by disabling the back button, excessive popups/pop-unders, etc. At least some of these policy violations can be determined by identifying error codes, and/or suspicious executable code. This may be accomplished by automatically attempting to load the Website in a browser and capturing the "bad" events at the browser level, or at the operating system level.

Finally, some examples of Website violations related to fraud include so-called "pay-to-click" Websites (e.g., those whose main purpose it to get people to select pay-per-click ads), etc. For example, click-spam Websites typically have content generated using a template and/or a high ads to text ratio. Further, there are existing techniques to detect index spammers (i.e., Websites that use illegitimate means to rank higher on search results). It is believed that there may be a correlation between those that engage in index spamming with those that engage in click spamming. Such a correlation may be used to help find click spammers by finding index spammers. Any of the foregoing information can be used to help discover these types of violations. In another approach, the abovementioned types of violations may be discovered by measuring a deviation of the actual click-through rate on the examined Website from the average click-through rate for all Websites. Moreover learning algorithms (naïve Bayes, SVMs, etc.) may be employed. For example, such algorithms may be used to train networks using the statistics of some known "pay-to-click" Websites. Such trained networks may then be used to identify new Websites.

Website quality scoring may be determined using defined quality criteria. Some examples of quality criteria of a Website include: usage data from the advertising network or other sources (e.g., impressions, selections, user geolocation, conversions, and derivatives of such information); Website (in advertising network, or not) popularity (e.g., as measured by Google toolbar for example); Website spam (e.g., so-called "link farms", where Websites are set up having little content of relevance but many links to each other to boost search engine scores, invalid content being on a page such as a pornographic Website having a black background and white text relating to porn, but black (and therefore hidden) text referring to digital cameras or other popular queries, to boost search engine scores, etc.); etc. Some examples of Website spam are described in U.S. patent application Ser. No. 10/748,664 (incorporated herein by reference and referred to as "the '664 application"), titled "INFORMATION RETRIEVAL BASED ON HISTORICAL DATA," filed on Dec. 31, 2003 and listing Anurag Acharya, Matt Cutts, Jeffrey Dean, Paul Haahr, Monika Henzinger, Urs Hoelzle, Steve Lawrence, Karl Pfleger, Olcan Sercinoglu and Simon Tong as inventors.

§4.3.1 Exemplary Methods

Figure 3:
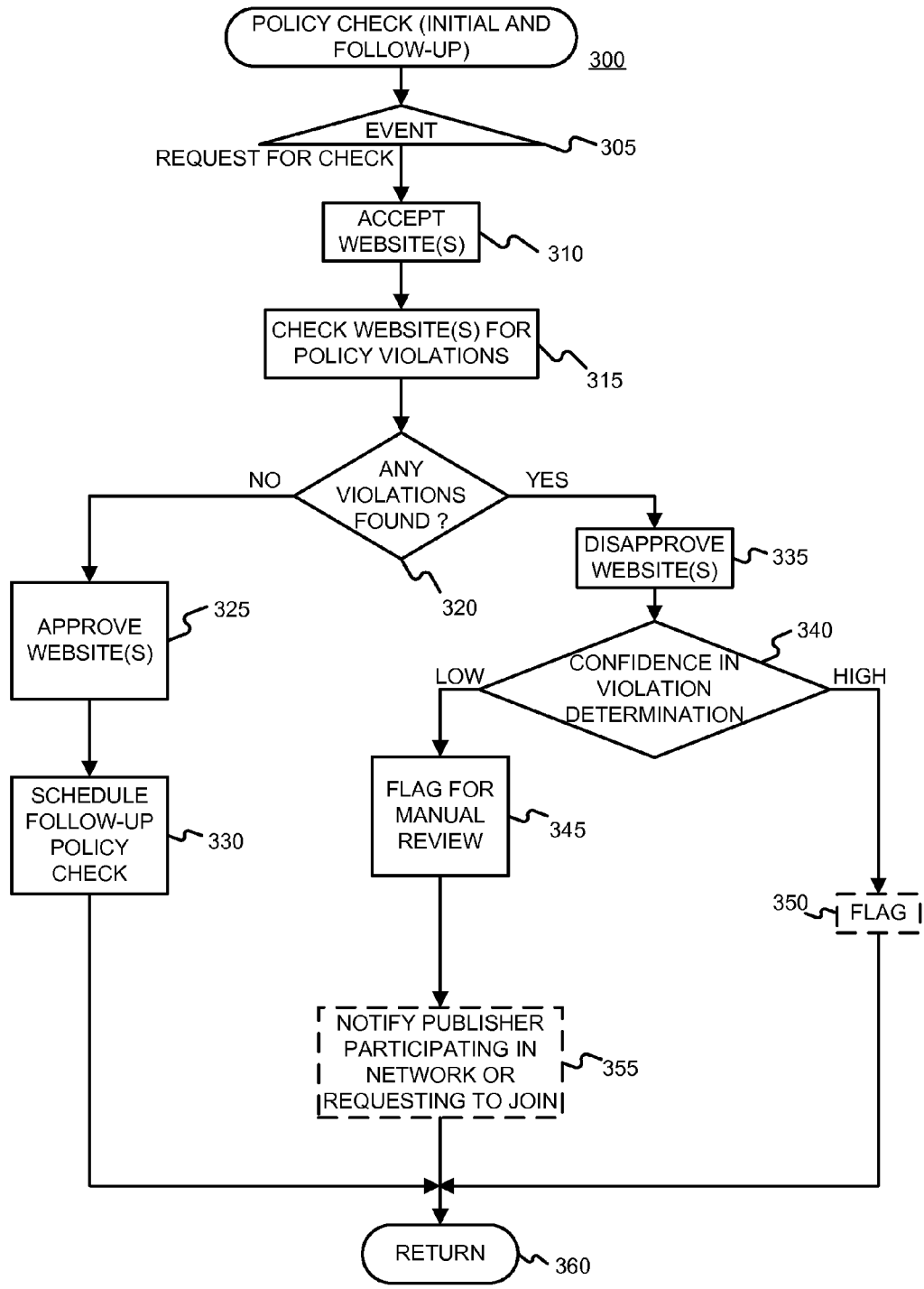
FIG. 3 is a flow diagram of an exemplary method that may be used to determine whether Websites comply with policies in a manner consistent with the present invention.

FIG. 3 is a flow diagram of an exemplary method 300 that may be used to automatically check Websites for policy violations in a manner consistent with the present invention. As indicated by event block 305, the main acts of the method 300 may be performed in response to receiving a request to check a Website. In response to the receipt of a check request, the method 300 may accept the Website (Block 310) and examine it for possible policy violations (Block 315). If no policy violations are found (Decision block 320), then the method 300 may simply approve the Website (Block 325) and schedule a follow-up policy check (Block 330) before the method 300 is left (Node 360).

Referring back to decision block 320, if, on the other hand, policy violations have been found, the method 300 may disapprove the Website. (Block 335) The method 300 may perform further acts based on the confidence of the policy violation determination(s). (Block 340) More specifically, if the confidence of the policy violation determination(s) is low, then the method 300 may flag (and/or queue) the Website for a manual review (Block 345) (Recall, e.g., the queuing operations 230 of FIG. 2.) and may notify the Website publisher (Block 355) before the method 300 is left (Node 360). This may allow possible policy violations to be confirmed or overridden manually. This may also allow Web publishers to make their case why their Website doesn't, in fact, violate a policy, or to take remedial actions. Referring back to decision block 340, if the confidence of the violation determination is high, then the method 300 may flag the Website to indicate that it has been rejected (e.g., no manual review is necessary) (Block 350) before the method 300 is left (Node 360).

Referring back to event block 305, the requests for an examination may originate from different sources. Specifically, the method 300 may receive requests from Web publishers desiring to participate in the advertising network, requests as part of the follow-up routine, etc. The request may originate from a business development source. For example, as will be described in more detail below, Website quality scoring operations (Recall, e.g., element 220 of FIG. 2.) may be used to help the advertising network to prospect for Websites that are not already participating in the advertising network, but that are good potential candidates based on their quality score(s). The business development source may want to pre-screen Websites for policy violations to narrow their search for prospective Websites to solicit.

Referring back to block 315, the method 300 examines the received Websites to determine if they violate any of policies put in place by the advertising network. Examples of policies were listed in §4.3 above.

Figure 4:
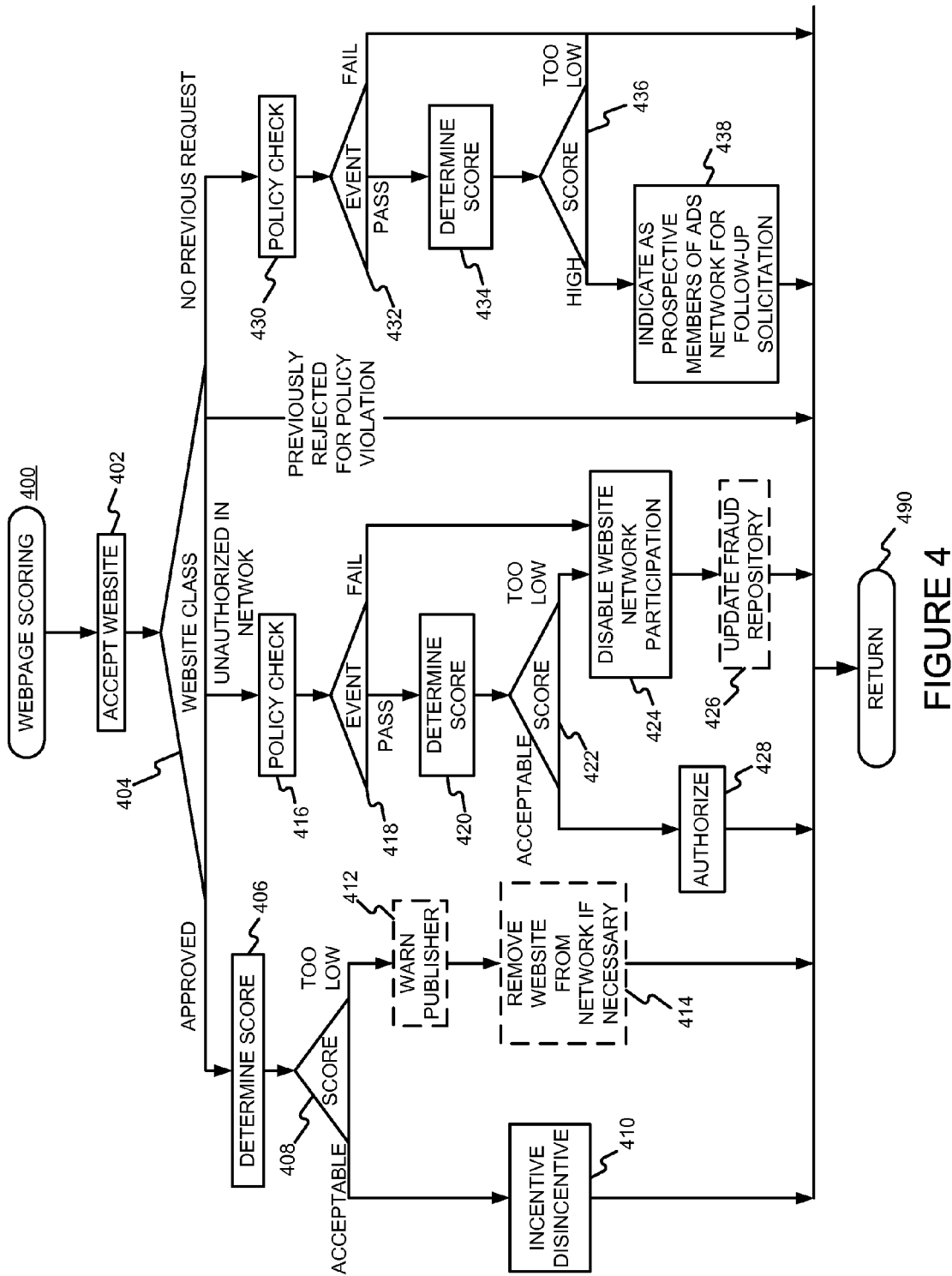
FIG. 4 is a flow diagram of an exemplary method that may be used to determine a quality score for Websites in a manner consistent with the present invention.

FIG. 4 is a flow diagram of an exemplary method 400 for scoring Website quality in a manner consistent with the present invention. A Website is accepted. (Block 402) As indicated by block 404, in the exemplary method 400, different types of Websites may be processed in different ways. For example, a Website may have been "previously approved" (e.g., previously passed a policy check). As another example, a Website may be in the advertising network but may have gained access by illegitimate or unauthorized means. As another example, a Website may be one that was previously rejected for one or more policy violations. As yet other example, a Website may be one that has not been previously checked (e.g., a Website that never sought to participate in the advertising network).

If the accepted Website is an "approved" Website (e.g., approved by policy compliance check operations 215), the method 400 may determine one or more quality scores for the Website. (Block 406) The method 400 may then perform different acts depending on whether or not the determined score is acceptable. (Block 408) If the score is acceptable, the method 400 may either provide incentives or disincentives (e.g., with respect to price charged to the advertiser, revenue share with Web publisher, fees to Web publishers, etc.) depending on the score value, or simply do nothing (Block 410) before the method 400 is left (Node 490). If the score is too low, the method 400 may warn the Web publisher about the low quality score, and/or remove the Website from participation in the advertising network (Blocks 412 and 414) before the method 400 is left (Node 490).

Referring back to block 404, if the received Website is an unauthorized Website in the advertising network, the method 400 may initially determine whether or not the unauthorized Website violates any policies. (Block 416) Referring to block 418, if the unauthorized Website fails the policy check, the method 400 may disable the Website from participation in the advertising network (Block 424), and perhaps update a fraud repository to include the rejected Website (Block 426) before the method 400 is left (Node 490). Referring back to block 418, if the unauthorized Website passes the policy check, the method 400 may proceed to determine a quality score. (Block 420) Referring to block 422, if the determined quality score is acceptable, the method 400 may ratify or authorize the Website's participation in the advertising network (Block 428) before the method 400 is left (Node 490). Referring again to block 422, if, on the other hand, the determined quality score is too low (not acceptable) the method 400 may disable the Website from participation in the advertising network (Block 424), and perhaps update a fraud repository to include the rejected Website (Block 426), before the method 400 is left (Node 490).

Referring back to block 404, if the received Website is one that was previously rejected for policy violations, the method 400 may simply disregard the Website and take no further action. This is because it may be a waste of resources to check the quality score of a Website that cannot participate in the advertising network anyway due to policy violation(s).

Referring back to block 404, Upon the reception of a Website that is not a part of the advertising network and that has not previously requested to join the advertising network, the method 400 may initially check the Website for any policy violations. (Block 430) Referring to block 432, if the website fails the policy examination, the method 400 may simply ignore the Website. If, on the other hand, the Website passes the policy examination, the method 400 may proceed to determine a quality score (Block 434) Referring to block 436, if the determined quality score is high, the method 400 may mark the Website as a prospective member for the advertising network for follow-up solicitation before the method 400 is left (Node 490) (Block 438) Referring again to block 436, if, on the other hand, the determined quality score is too low (not acceptable) the method 400 may simply ignore the Website.

Referring back to blocks 406, 420 and 434, the method 400 may use one or more functions to determine one or more quality scores. As mentioned earlier, the quality score(s) may reflect some measure of value of the Website to the advertising network.

Still referring to blocks 406, 420 and 434, after score values have been determined, the method 400 may use (e.g., predetermined) threshold values to decide which Websites are to be accepted and which are to be rejected.

Referring back to block 404, the method 400 may receive various types of Websites, some of which have not gone through a policy check. (Recall, e.g., policy compliance check operations 215 of FIG. 2.) For example, Websites that are unauthorized in the advertising network and Websites that have not previously requested to join the network might not have been checked for policy violations. Hence, the method 400 may send requests to the policy compliance checking operations 215, and receive the check results, as shown by blocks 416 and 430.

Referring back to block 410, the method 400 may either provide incentives or disincentive depending on score value(s). For instance, if the Website score value is high, the advertising network may provide the Web publisher with incentives (e.g., an increased amount per selection, an increased percentage of advertising revenue, decreased participation costs, etc.) since it provides a high quality Website. On the other hand, if the Website score value is low (but acceptable), then the advertising network may provide the Web publisher with disincentives (e.g., a decreased amount per selection, a decreased percentage of advertising revenue, added costs, etc.) for not providing a high quality Website. This may encourage the Web publishers to improve their Websites.

Figure 5:
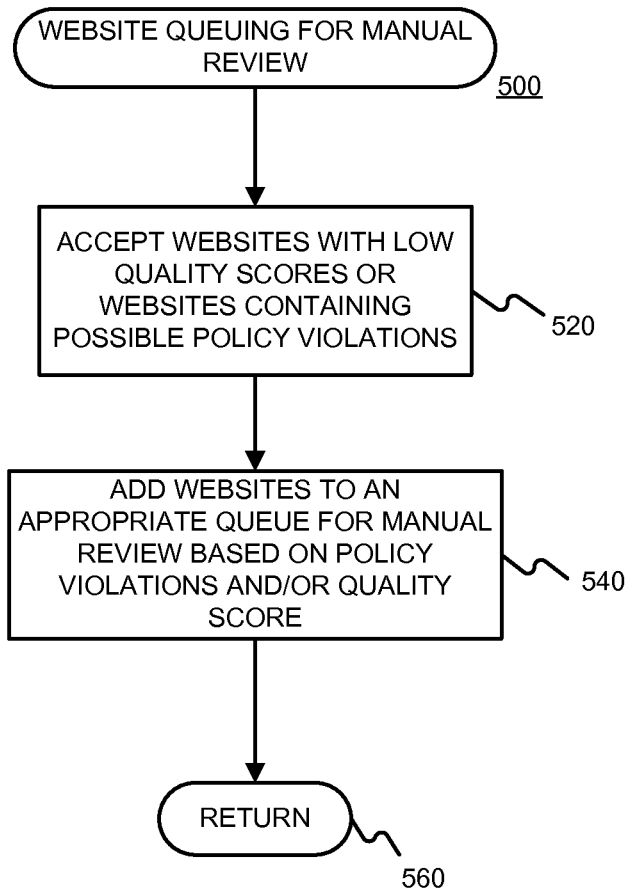
FIG. 5 is a flow diagram of an exemplary method that may be used to flag and queue Websites for a more detailed (e.g., manual) review in a manner consistent with the present invention.

FIG. 5 is a flow diagram of an exemplary method 500 that may be used to queue Websites for manual review in a manner consistent with the present invention. Specifically, the method 500 may obtain Websites with low quality scores or Websites containing possible policy violations (Recall e.g., block 345 of FIG. 3.). (Block 520) Next, the flagged Websites may be added to an appropriate queue comprised of flagged Websites ready to be presented for manual review. (Block 540)

Referring back to block 520, the method 500 may obtain low quality scored Websites (e.g., from the Website quality scoring operations 220 of FIG. 2) and/or Websites containing possible policy violations (e.g., from the policy compliance checking operations 215 of FIG. 2.). For example, the Websites containing possible violations may be those Websites that have been disapproved with a low confidence by the policy compliance checking operations 215. Recall that these operations 215 may simply flag such Websites for manual review by forwarding them to the Website queuing operations 230. The low quality score Websites may be those Websites approved after having been examined for policy violations, but that have attained score values that are low (but perhaps not low enough for automatic termination). Therefore, the method 500 may schedule these Websites for a manual review in which humans may make the final decision as to whether or not the quality score is acceptable.

Referring back to block 540, the method 500 may add the flagged Website(s) to a one or more queues of flagged Websites. Different queues may reflect different priorities and/or different types of policy violations queues. For example, different queues may be provided for different levels of priority. As a more specific example, queues may be prioritized using a combination of violation severity, violation type, number of violations, etc. This allows Websites with a single, less serious policy violation (which have a higher likelihood of having their rejection overruled manually) to be reviewed quicker than Websites with multiple serious policy violations (which are less likely to be approved).

As another example, the queues may be provided based on the type of policy violation. This permits the manual review of Websites with policy violations to be specialized. For example, one or more people may be responsible for review of Websites believed to be hate-centric, while one or more other people may be responsible for review of Websites believed to sell alcohol. Such specialization permits a more uniform and appropriate application of the policies.

Figure 6:
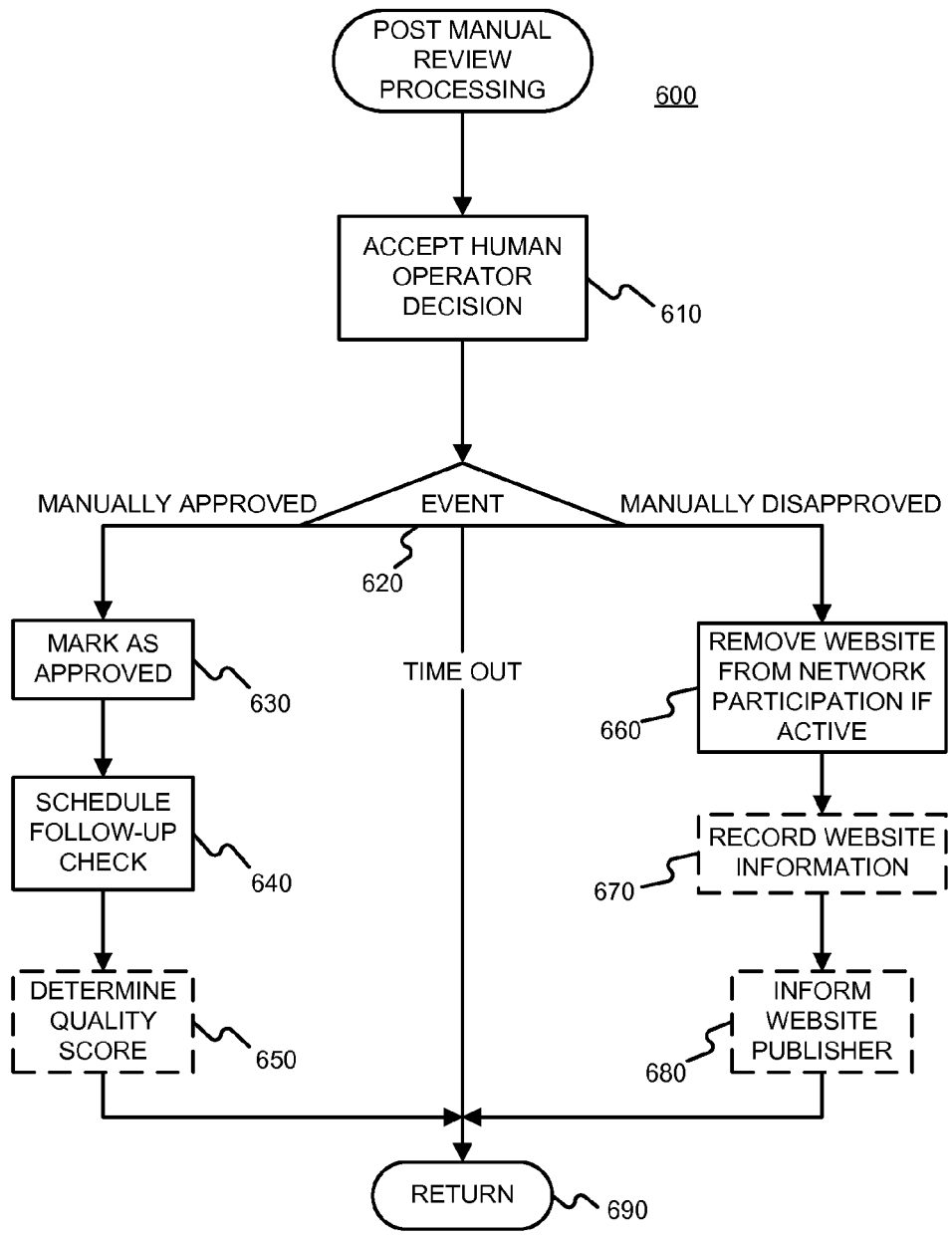
FIG. 6 is a flow diagram of an exemplary method that may be used to process manually reviewed Websites in a manner consistent with the present invention.

FIG. 6 is a flow diagram of an exemplary method 600 that may be used to process manually reviewed Websites in a manner consistent with the present invention. In particular, the method 600 may accept the decision (e.g., to approve or disapprove a flagged Website, or perhaps to reassign the review to another reviewer/department) of a human reviewer. (Block 610) Referring to block 620, if the Website is manually approved, then the method 600 may mark the Website as approved (or perform whatever acts are necessary to have the Website added to the advertising network), and a follow-up policy check may be scheduled (Blocks 630 and 640) before the method 600 is left (Node 690). Further, the method 600 may take steps needed to determine a quality score. (Block 650)

Referring back to block 620, if the Website is manually disapproved, then the method 600 may remove the Website from network participation if active (Block 660) before the method 600 is left (Node 690). In such a case, the method 600 may also record information about the rejected Website, and/or inform the Website publisher. (Blocks 670 and 680)

As an addition to the above, the human operator decisions may be used in conjunction with learning algorithms (naïve Bayes, SVMs, etc.) so as to train (e.g., based on past human operator decisions) and tune the Webpage scoring operations (Recall, e.g., method 400 of FIG. 4.). Doing so may result in a more effective and accurate scoring procedure, thereby making the system more efficient while reducing human intervention (manual reviews).

§4.3.2 Exemplary Apparatus

Figure 7:
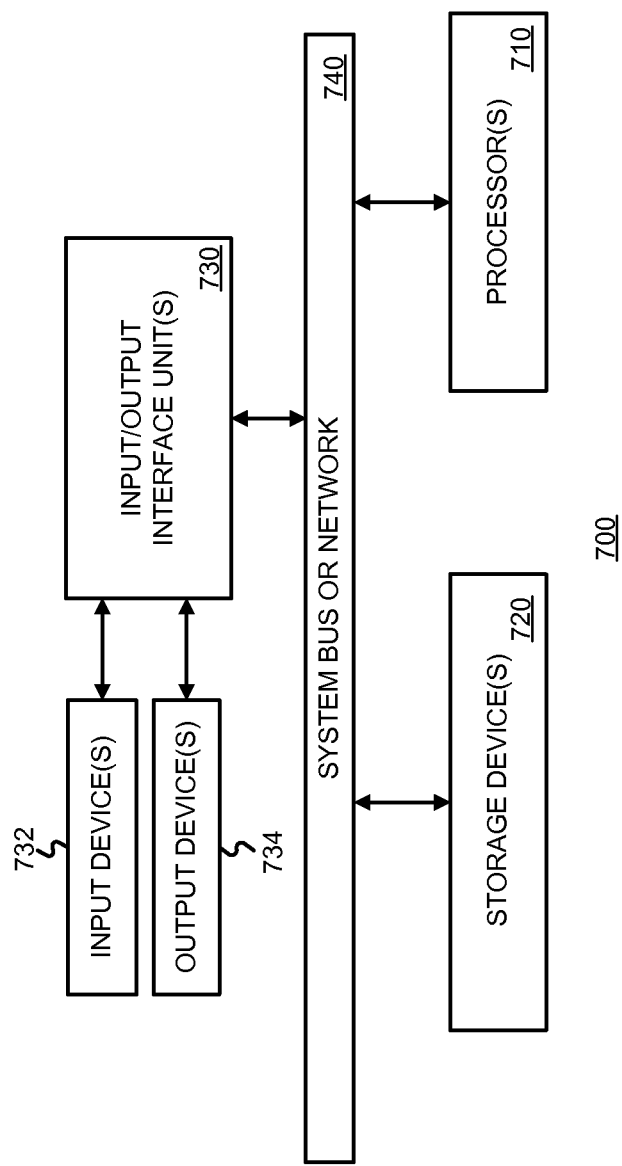
FIG. 7 is a block diagram of an exemplary apparatus that may perform various operations in a manner consistent with the present invention.

FIG. 7 is high-level block diagram of a machine 700 that may perform one or more of the operations discussed above, and store various information discussed above. The machine 700 includes one or more processors 710, one or more input/output interface units 730, one or more storage devices 720, and one or more system buses and/or networks 740 for facilitating the communication of information among the coupled elements. One or more input devices 732 and one or more output devices 734 may be coupled with the one or more input/output interfaces 730

The one or more processors 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform or more aspects of the present invention. At least a portion of the machine executable instructions may be stored (temporarily or more permanently) on the one or more storage devices 720 and/or may be received from an external source via one or more input interface units 730.

In one embodiment, the machine 700 may be one or more conventional personal computers. In this case, the processing units 710 may be one or more microprocessors. The bus 740 may include a system bus. The storage devices 720 may include system memory, such as read only memory (ROM) and/or random access memory (RAM). The storage devices 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. The output devices 734 may include a monitor or other type of display device, which may also be connected to the system bus 740 via an appropriate interface. In addition to (or instead of) the monitor, the personal computer may include other (peripheral) output devices (not shown), such as speakers and printers for example.

§4.3.3 Refinements and Alternatives

The present invention is not limited to the particular policy violations described above, nor is the present invention limited to the particular quality scores described above.

Although both Website policy compliance checking and Website scoring were described, it is not necessary to perform both.

Policy compliance checking may be requested by various parties, and may occur at various times. For example, a Web publisher may request that its Website be added to an advertising network. The advertising network, or an agent for the advertising network, may check the Website for policy compliance before it is added to the advertising network. As another example, since a Website may be changed after it has been accepted into the advertising network, the advertising network or an agent for the advertising network (collectively referred to "the advertising network") may re-check the Website for policy compliance. As yet another example, since policies may be changed (e.g., relaxed, made more strict, expanded, reduced, etc.), it may be desirable for the advertising network to reassess a Website (previously accepted and/or previously rejected) in view of the policy change(s). As still another example, an advertising network may check participants in its advertising network for policy compliance to help find unauthorized Websites. As yet still another example, business development for the advertising network may want to entice Web publishers to join the advertising network. Business development may use the present invention to filter out potential candidates that would violate one or more policies of the advertising network.

Whether or not a quality score is low may be determined using predetermined heuristics, predetermined or dynamically determined (absolute and/or relative) thresholds, etc.

Quality scoring may be requested by various parties, and may occur at various times. For example, the advertising network may measure the quality of Websites participating in their network (e.g., to satisfy advertisers and/or end users). The advertising network may want to provide incentives and/or disincentives with a goal of improving the quality of Websites on the advertising network, or at least adjust advertiser payments and/or Web publisher compensation accordingly.

Although many of the exemplary embodiments were described in the context of Websites, they may be applied to Web pages and other types of documents or collections of documents. As one example, ads may be served with e-mail, such as with G-Mail offered by Google, Inc. The content of email might be checked (e.g., in real time) for policy violations.

§4.4 Conclusions

As can be appreciated from the foregoing, embodiments consistent with the present invention help advertising networks to (i) be good corporate citizens, (ii) ensure Websites in their network will not be offensive or controversial, (iii) avoid illegalities, (iv) improve the quality of Websites on their network, (v) protect and enhance their brand, and/or (vi) adjust advertiser payments and/or Web publisher compensation and/or fees based on Website quality. Such embodiments further allow advertising networks to accomplish such means more efficiently, and more quickly.

What is claimed is:

1. A computer-implemented method comprising:
   receiving, by a computer system including at least one computer, a list of collections, each of the collections including one or more documents and at least some of the collections having a violation of a given policy of an advertising network;
   training, by the computer system, an expert system to classify other collections as having the given policy violation or not;
   receiving, by the computer system, a first collection including one or more documents associated with a first request by a publisher to host advertisements of advertisers belonging to an advertising network;
   determining, by the computer system and using the trained expert system, whether or not the first collection complies with policies of an advertising network, and wherein the policies are independent of the advertisements of the advertisers belonging to the advertising network, by generating a first quality score for the first collection, by the trained expert system, based on inclusion or exclusion of predetermined items corresponding to each policy and comparing the generated first quality score to a first threshold;
   approving, by the computer system, the first collection responsive to a determination by the trained expert system that the first collection complies with the policies of the advertising network based on the generated quality score being greater than the first threshold;
   processing, by the computer system, the first collection to the advertising network such that advertisements of the advertisers belonging to the advertising network may be served in association with renderings of the one or more documents included in the first collection;
   determining, by the computer system, that the first quality score is greater than a second threshold, the second threshold greater than the first threshold;
   providing an incentive, by the computer system, to a publisher of the first collection, responsive to the determination that the first quality score is greater than the second threshold;
   receiving, by the computer system, a second collection including one or more documents associated with a second request by a publisher to host advertisements of advertisers belonging to an advertising network;
   determining, by the computer system and using the trained expert system, whether or not the second collection complies with the policies, by generating a second quality score for the second collection, by the trained expert system, based on inclusion or exclusion of predetermined items corresponding to each policy and comparing the generated second quality score to the first threshold;
   approving, by the computer system, the second collection responsive to a determination by the trained expert system that the second collection complies with the policies of the advertising network based on the generated second quality score being greater than the first threshold;

processing, by the computer system, the second collection to the advertising network such that advertisements of the advertisers belonging to the advertising network may be served in association with renderings of the one or more documents included in the second collection;

determining, by the computer system, that the second quality score is less than the second threshold; and providing a disincentive, by the computer system, to a publisher of the second collection, responsive to the determination that the first quality score is less than the second threshold.

2. The computer-implemented method of claim 1 wherein the expert system is one of (A) a neural network, (B) a Bayesian network, or (C) a support vector machine.

3. The computer-implemented method of claim 1 further comprising:

scheduling a follow-up determination of whether or not the first collection complies with the policies of the advertising network.

4. The computer-implemented method of claim 1 wherein the first collection including one or more documents is a first Website including one or more Webpages, and wherein the second collection including one or more documents is a second Website including one or more Webpages.

5. The computer-implemented method of claim 1 wherein at least one of the first and second collections includes one or more documents which includes at least one of (A) audio content, or (B) video content.

6. The computer-implemented method of claim 1 wherein at least one of the first and second collections includes one or more documents which includes an online game.

7. The method of claim 1, wherein the advertising network, the advertisers of the advertising network and the publisher are different entities.

8. The method of claim 1, further comprising determining that the generated second quality score for the second collection is greater than the first threshold but is less than the second threshold; and responsive to the determination, adding the second collection to a queue for review.

9. The method of claim 8, wherein adding the second collection to a queue for review further comprises determining a number of policy violations of the second collection, and adding the second collection to a queue having a priority inversely proportional to the number of policy violations.

10. The method of claim 9, wherein adding the second collection to a queue for review further comprises determining a severity of policy violations of the second collection, and adding the second collection to a queue having a priority inversely proportional to the severity of the policy violations.

11. A system, comprising a computer system including at least one computer comprising a processor, wherein the processor is configured for:

receiving a list of collections, each of the collections including one or more documents and at least some of the collections having a violation of a given policy of an advertising network;

training an expert system to classify other collections as having the given policy violation or not;

receiving a first collection including one or more documents associated with a first request by a publisher to host advertisements of advertisers belonging to an advertising network;

determining, using the trained expert system, whether or not the first collection complies with policies of an advertising network, and wherein the policies are independent of the advertisements of the advertisers belonging to the advertising network, by generating a first quality score for the first collection, by the trained expert system, based on inclusion or exclusion of predetermined items corresponding to each policy and comparing the generated first quality score to a first threshold;

approving the first collection responsive to a determination by the trained expert system that the first collection complies with the policies of the advertising network based on the generated quality score being greater than the first threshold;

processing the first collection to the advertising network such that advertisements of the advertisers belonging to the advertising network may be served in association with renderings of the one or more documents included in the first collection;

determining that the first quality score is greater than a second threshold, the second threshold greater than the first threshold;

providing an incentive to a publisher of the first collection, responsive to the determination that the first quality score is greater than the second threshold;

receiving a second collection including one or more documents associated with a second request by a publisher to host advertisements of advertisers belonging to an advertising network;

determining, using the trained expert system, whether or not the second collection complies with the policies, by generating a second quality score for the second collection, by the trained expert system, based on inclusion or exclusion of predetermined items corresponding to each policy and comparing the generated second quality score to the first threshold;

approving the second collection responsive to a determination by the trained expert system that the second collection complies with the policies of the advertising network based on the generated second quality score being greater than the first threshold;

processing the second collection to the advertising network such that advertisements of the advertisers belonging to the advertising network may be served in association with renderings of the one or more documents included in the second collection;

determining that the second quality score is less than the second threshold; and providing a disincentive to a publisher of the second collection responsive to the determination that the first quality score is less than the second threshold.

12. The system of claim 11, wherein the expert system is one of (A) a neural network, (B) a Bayesian network, or (C) a support vector machine.

13. The system of claim 11, wherein the processor is further configured for:

scheduling a follow-up determination of whether or not the first collection complies with the policies of the advertising network.

14. The system of claim 11, wherein the first collection including one or more documents is a first Website including one or more Webpages, and wherein the second collection including one or more documents is a second Website including one or more Webpages.

15. The system of claim 11, wherein at least one of the first and second collections includes one or more documents which includes at least one of (A) audio content, or (B) video content.

16. The system of claim 11, wherein at least one of the first and second collections includes one or more documents which includes an online game.

17. The system of claim 11, wherein the advertising network, the advertisers of the advertising network and the publisher are different entities.

18. The system of claim 11, wherein the processor is further configured for determining that the generated second quality score for the second collection is greater than the first threshold but is less than the second threshold; and responsive to the determination, adding the second collection to a queue for review.

19. The system of claim 18, wherein the processor is further configured for determining a number of policy violations of the second collection, and adding the second collection to a queue having a priority inversely proportional to the number of policy violations.

20. The system of claim 18, wherein the processor is further configured for determining a severity of policy violations of the second collection, and adding the second collection to a queue having a priority inversely proportional to the severity of the policy violations.

* * * * *

UNITED STATES PATENT AND TRADEMARK OFFICE
CERTIFICATE OF CORRECTION

PATENT NO. : 8,762,204 B2  
APPLICATION NO. : 12/839262  
DATED : June 24, 2014  
INVENTOR(S) : Desikan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Eighth Day of September, 2015

Michelle K. Lee
*Director of the United States Patent and Trademark Office*